United States Patent
Valio

(10) Patent No.: US 6,658,048 B1
(45) Date of Patent: Dec. 2, 2003

(54) GLOBAL POSITIONING SYSTEM CODE PHASE DETECTOR WITH MULTIPATH COMPENSATION AND METHOD FOR REDUCING MULTIPATH COMPONENTS ASSOCIATED WITH A RECEIVED SIGNAL

(75) Inventor: Harri Valio, Lempäälä (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/545,703

(22) Filed: Apr. 7, 2000

(51) Int. Cl.[7] ............................................... H04B 1/707
(52) U.S. Cl. .................................. 375/150; 342/357.12
(58) Field of Search .............................. 375/140, 142, 375/144, 148, 149, 150, 145, 343, 346, 349, 350, 355; 342/357.01, 357.02, 357.03, 357.04, 357.06, 357.08, 357.12, 357.05, 358; 701/213, 215

(56) References Cited

U.S. PATENT DOCUMENTS

| | | | |
|---|---|---|---|
| 5,402,450 A | | 3/1995 | Lennen ........................ 375/343 |
| 5,414,729 A | | 5/1995 | Fenton ........................ 375/209 |
| 5,808,582 A | * | 9/1998 | Woo ....................... 342/357.12 |
| 6,047,017 A | | 4/2000 | Cahn et al. ................. 375/200 |
| 6,198,765 B1 | * | 3/2001 | Cahn et al. ................. 375/142 |
| 6,208,291 B1 | * | 3/2001 | Krasner ................. 342/357.12 |
| 6,249,542 B1 | * | 6/2001 | Kohli et al. ................ 375/150 |
| 6,311,129 B1 | * | 10/2001 | Lin ............................. 701/214 |
| 6,313,789 B1 | * | 11/2001 | Zhodzishsky et al. . 342/357.12 |
| 6,317,078 B1 | * | 11/2001 | Renard et al. ......... 342/357.05 |
| 6,347,113 B1 | * | 2/2002 | Hatch ......................... 375/149 |
| 6,493,378 B1 | * | 12/2002 | Zhodzishsky et al. ...... 375/149 |

OTHER PUBLICATIONS

"GPS Receiver Architectures and Measurements" by Braasch, Member, IEEE and Van Dierendonck, Proceedings of the IEE, vol. 87, No. 1, Jan. 1999, pp. 48–64.

"Understanding GPS Principles and Applications", Kaplan, Editor, Artech House Publishers, Copyright 1996. Not enclosed.

* cited by examiner

Primary Examiner—Chi Pham
Assistant Examiner—Khanhcong Tran
(74) Attorney, Agent, or Firm—Ware, Fressola, Van Der Sluys & Adolphson LLP

(57) ABSTRACT

A method for compensating for multipath components in a received CDMA signal comprising a repetitive PRN code uses delay times in addition to the early, late and prompt delay times for determining if a multipath component is present in the received signal, and if so, making an adjustment to the delay time of the replica code generated by a receiver so as to minimize the difference between the correlation values for a delay time equal to −1 chip and a delay time more negative than −1 chip. In this manner, adjustments to the estimation time for the start of the PRN code can be made in a manner which minimizes the effects of multipath components. A system using additional delays and correlators in association with the code phase detector, a code numerical control oscillator and replica code generator is described for performing the above methodology. The methodology is particularly suitable for GPS receivers and may further be used in receivers that receive any type of digital sequence spread spectrum, code division multiple access signals. Compensation for multipath components with 180 degree phase shifts is also made as well as compensation due to smoothing of the triangular correlation function due to RF characteristics and non-ideal PRN codes.

24 Claims, 7 Drawing Sheets

GLOBAL POSITIONING SYSTEM CODE PHASE DETECTOR WITH MULTIPATH COMPENSATION AND METHOD FOR REDUCING MULTIPATH COMPONENTS ASSOCIATED WITH A RECEIVED SIGNAL

TECHNICAL FIELD

The present invention relates to global positioning systems (GPS) and in particular, to any satellite navigation system. It is also generally directed to direct sequence spread spectrum (DSSS) code-division multiple access (CDMA) communication systems.

BACKGROUND OF THE INVENTION

Satellite navigation systems are systems which use a plurality of satellite vehicles (SVs) to provide accurate timing signals and navigation data which can be utilized by a navigation receiver to determine the range between the receiver and a satellite. By determining the range for at least four SVs, three-dimensional position location via intersection of the associated ranging spheres can be used to determine the three-dimensional location of the receiver; that is, the position of the receiver with respect to the surface of the earth as well as its height relative to the surface of the earth (the height may represent the elevation of the receiver on the earth or the height of the receiver above the earth in situations where the receiver is in some type of aircraft or the like; the fourth SV is necessary for local clock correction).

The concept underlying range determination is time-of-arrival (TOA) ranging, that is determining a position between the source of a signal and a receiver receiving the signal by measuring the propagation time of the signal from the transmitter to the receiver. In order to accomplish this TOA determination, it is necessary that SVs accurately and repetitively generate timing signals based upon a system clock which is effectively synchronized to the receiver system clock. It is thereby possible to determine the length of time it takes the signal to traverse the distance between the transmitter (satellite) and the receiver, and by knowledge of the propagation speed of the propagating signal (typically the propagation speed of the speed of light, c), it is possible to determine the distance between the satellite and the receiver.

Through similar range information for at least four SVs, the intersection of the three ranging spheres denotes two points (locations), one of which is the correct position of the receiver. The two candidate locations are mirror images of one another with respect to the plane of the three SVs and for a user on the earth's surface, it is therefore apparent that the lower location will be the receiver's true position. For users above the earth's surface, such unambiguous determination is not always possible without ancillary information. General information concerning the satellite navigation system deployed by the United States (which is commonly referred to as GPS), as well as the satellite navigation system deployed by Russia's Ministry of Defence (known as the Global Navigation Satellite System-GLONASS-) is presented in *Understanding GPS Principles and Applications*, E. D. Kaplan, Editor, Artech House Publishers, Copyright 1996.

With respect to the discussions herein, the acronym GPS will generally refer to any type of satellite navigation system.

In order to generate such timing signals and navigation data which can be used by the receiver to determine the position of the SV at the time of generating a timing signal, the satellite system employs a characteristic frequency methodology. In particular, GPS satellite signals include frequency assignment, modulation format and the generation of pseudo-random noise (PRN) codes. Each GPS satellite transmits two carrier frequencies, L1, the primary frequency, and L2, the secondary frequency. The carrier frequencies are modulated by spread spectrum codes with a unique PRN sequence associated with each SV and at least one carrier frequency is further modulated by the navigation data. All GPS SVs transmit at the same two carrier frequencies but their signals are effectively non-interfering with each other due to the unique PRN codes that are essentially non-correlating to each other. Thus the PRN code sequences for each of the SVs are nearly uncorrelated with respect to each other and thus the SV signals can be separated and detected by a technique known as code-division multiple access (CDMA). Detailed discussion of this modulation technique is presented in Chapter 4 of *Understanding GPS Principles and Applications*. The specific PRN CDMA codes used for the GPS SVs are sometimes referred to as Gold codes.

As discussed earlier, the GPS receiver's primary task is the measurement of range and range rate (that is the change in range) between itself and each of a plurality of visible SVs. To perform this task the satellite receiver must also demodulate the received navigation data. The navigation data consists of a 50 bits per second data stream which is modulated onto the GPS PRN modulated signal. Navigation data contains the SV clock information as well as the orbital elements for the SV, the latter elements used to compute the position of the SV at the time of generation of the received PRN code. Details concerning fundamentals of satellite orbits can be found in Section 2.3 of the above-identified text, *Understanding GPS Principles and Applications*.

The GPS signal modulation format is known as direct sequence spread-spectrum. An overview of GPS signal processing is presented in Braasch, M. S., "*GPS Receiver Architectures and Measurements*," Proc. of the IEEE, Vol. 87, 1. Jan. 19, 1999, pp 48–64. As there discussed, in a spread-spectrum system the data are modulated onto the carrier such that the transmitted signal generally has a much larger bandwidth than the information rate of the data. The spread spectrum system typically uses a deterministic signal known to the receiver (the PRN code) which is used by the transmitter to modulate the information signal and spread the spectrum of the transmitted signal. Finally, the spread-spectrum system uses a receiver which cross correlates the received signal with a copy of the deterministic signal in the process of demodulating the data and by so doing, the transmitted data is recovered.

The type of spread-spectrum used by the GPS satellite system is binary phase shift keying direct sequence spread-spectrum (BPSK DSSS). The term "direct sequence" means that the spreading of the spectrum is accomplished by phase modulation of the carrier. Binary phase shift keying is the simplest form of phase modulation where the carrier is instantly phase shifted by 180 degrees at the time of a bit change.

Thus during normal navigation operation, a GPS receiver must adjust a local deterministic signal (replica code), which for GPS receivers is the PRN CDMA code, in order to determine a match of this PRN CDMA code with the PRN code received and thereby identify the satellite as well as the timing signal which is embodied in the PRN code received. In addition, the receiver must employ a Doppler Compensation Circuit for each satellite being received.

The operation of the continuously adjusting the local replica PRN CDMA code generator is known as code phase tracking, while the Doppler Compensation Circuit adjustment for each SV is known as carrier phase tracking. The tracking sub-systems are often referred to as tracking loops in order to emphasize the fact that tracking involves a closed-loop control system. As noted earlier, what makes the GPS satellite system different from typical CDMA communication systems is the fact that the DSSS spreading code is not only a modulation method or multiple access method but is also a technique used to accurately measure the propagation delays from each SV to the receiver. It thus represents a timing signal which is used to determine the range between each satellite and the receiver.

Algorithms are used by GPS receivers that can estimate the delay (time of arrival) of each SV code with accuracy which is better than the number of bits in the spreading code, which for civilian GPS use is 1,023 bits per second. This PRN spreading code is known as course acquisition (C/A) (a higher frequency "P" code is also transmitted by the SVs—this P code has a frequency ten times that of the C/A code, although the P code is encrypted and is generally not available for civilian use). In order to emphasize that these 1,023 bits do not represent data bits, these bits are normally referred to as "chips" in GPS parlance. Thus the specific PRN code sequence for each SV is repetitively transmitted by the specific SV every millisecond.

Since the course acquisition (C/A) code has a 1 millisecond period which repeats constantly, the code length effectively limits the precision of the range determination. To achieve sub-chip delay measurement accuracy, it is necessary to take into account, multipath propagation effects in order to mitigate these effects. Multipath propagation effects occur when the signal from the SV to the receiver is received in not only the direct unobstructed path, but along other paths such as reflection off of buildings, surrounding structures, aircraft and the like. The most harmful multipath components are components with delay differences of 0 to 1.0 chip corresponding respectively to 0 nanoseconds and 1 microsecond delays. At the propagation speed of light (c), these chip delays correspond to 0 meter and 300 meter path differences respectively.

Thus the resistance of the code phase detector of the satellite receiver to multipath contaminated signals is a very important characteristic that dominates range determination and thus positioning accuracy.

SUMMARY OF THE INVENTION

The present invention is directed to minimizing the effects of multipath disturbances of GPS signals so as to maintain precise timing with respect to the received PRN CDMA code. Multipath components of the SV signal are components which do not take a direct path to the receiver but rather arrive later than a direct line path. Such multipath components can result from reflections caused by aircraft, buildings, terrain and the like and effectively degrade the received GPS signal. Since each multipath component arrives at the receiver after the straight line signal (that is non-reflected signal), the multipath components do not affect the starting point of the leading edge of the correlation function. The correlation function is the correlation between the received PRN CDMA code and the replica PRN code generated at the receiver which is used to determine when the PRN CDMA code has arrived at the receiver. It is observed that a comparison of the amplitude of the correlation function at the beginning of the leading edge of the correlating region to the amplitude of the correlation function in a non-correlating region should yield a value of zero.

However, it is also observed that this initial point (at −1 bit or as commonly called −1 chip) begins to climb up the leading edge of the correlating region if multipath components of the received signal are present. This initial (−1 chip) point movement is due to multipath skewing of the correlation triangle. This initial point movement can be measured and used to compensate for multipath effects.

The present invention uses this information concerning movement of the initial point of the correlation function due to receipt of multipath components of the CDMA code to compensate for such components and thereby correct the location of the start of the PRN CDMA code. This start point is the point of maximum correlation and is called the prompt (P) correlator. Thus the multipath component effects on the exact timing of the receipt of the PRN CDMA code is minimized, thereby giving greater accuracy to the range determination between the SV and the receiver.

BRIEF DESCRIPTION OF THE DRAWINGS

For a fuller understanding of the nature and objects of the present invention, reference should be made to the following detailed description, taken in conjunction with the following drawings in which.

DETAILED DESCRIPTION

Figure 1:
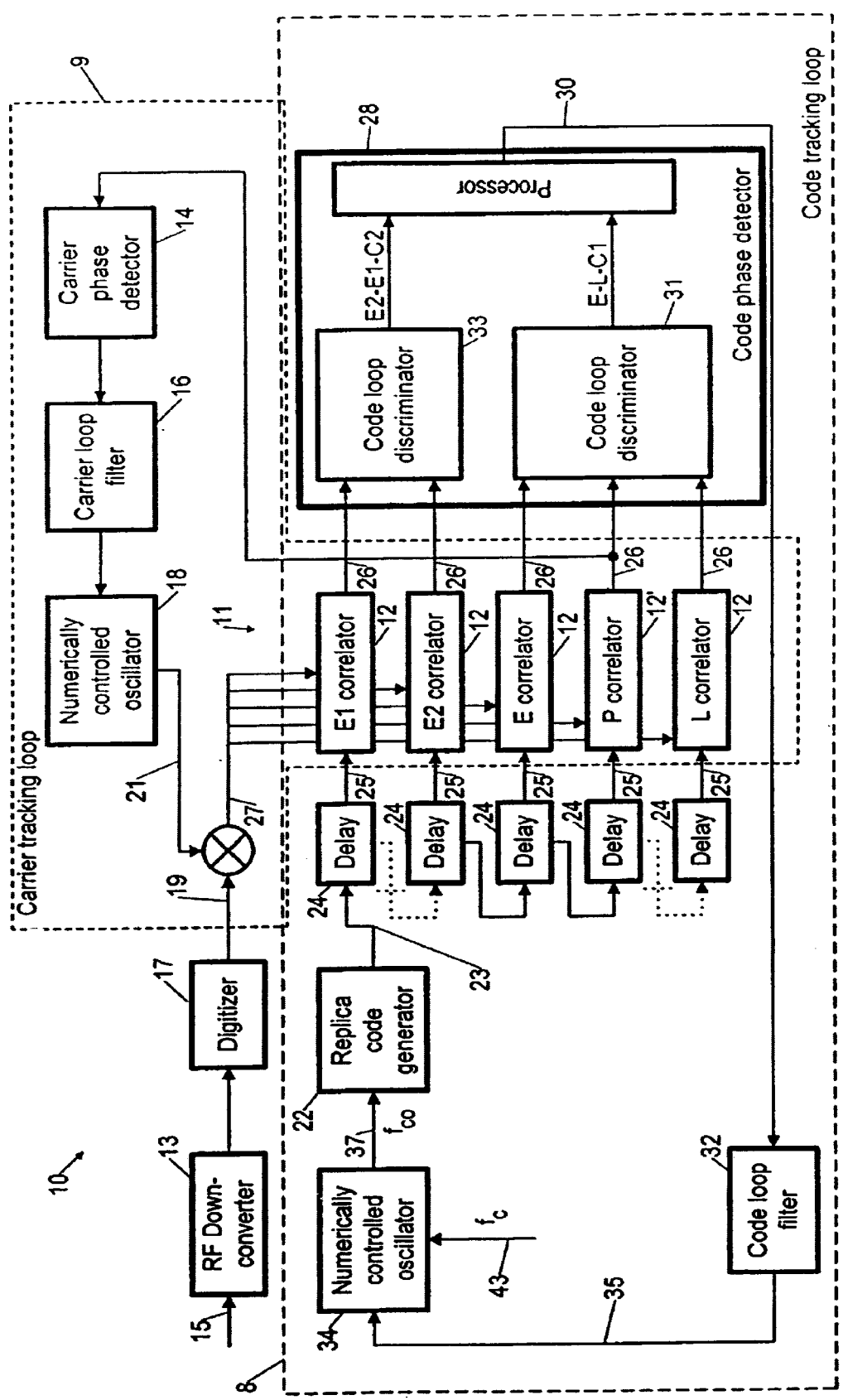
FIG. 1 is an overall block diagram of the GPS code and carrier tracking loops according to the present invention.

As discussed above, a GPS receiver must replicate the pseudo-random noise (PRN) code that is repetitively transmitted by a satellite vehicle (SV) as such a code is received by the receiver. The receiver must further phase shift this replica code until it correlates with the SV PRN code. In practice, the course/acquisition (C/A) PRN code used for civilian use of GPS satellite systems comprises a 1,023 bit PRN sequence, with each sequence for each satellite being unique and predominately non-correlated to the PRN code sequence of the remaining satellites in the constellation of satellites forming the overall satellite global position satellite communication system. These non-correlating PRN codes used by the constellations of satellites are known as "Gold" codes. Thus when the phase of the GPS receiver replica code matches the phase of an incoming SV CDMA code, there is maximum correlation similar to what is ideally shown in FIGS. 2A and 3. When the phase of the replica code is offset by more than 1 bit (which is referred to in GPS terminology as 1 chip) on either side of an incoming SV PRN CDMA code, there is minimum correlation. This result is true for any PRN code correlation as more fully discussed in *Understanding GPS Principles and Applications*, Section 4.1.3. Further details illustrating correlation of a PRN code can be found at http://www.utexas.edu/depts/grg/gcraft/notes/gps/gps-html (in particular the C/A code phase assignments, the C/A code PRN chips and the Correlation Animation portions thereof).

Furthermore, the GPS receiver must also detect the satellite vehicle carrier by replicating the carrier, its phase and Doppler shift. Therefore. the GPS signal acquisition and tracking process is a two-dimensional (code and carrier) signal replication process. Further details concerning GPS signal acquisition and tracking can, be found at Chapter 5 of the above-mentioned text.

The carrier frequencies of the GPS satellite system uses two frequencies called L1 (1575.42 MHz) and L2 (1227.6 MHz) with the satellite ranging code (PRN code) and the navigation data (data concerning orbital elements, satellite time and other data) being encoded by using code division multiple access (CDMA) of at least one of these two carrier frequencies. The navigation data provides the satellite receiver with the information necessary to determine the location of the satellite at the time of PRN transmission and comprises a 50 bit per second modulation of at least one carrier frequency while the ranging code is a PRN code which enables the user's satellite receiver to determine the transit time; that is, the propagation time of the signal from the SV to the receiver and thereby provide a means for determining the SV to user range based on time of arrival (TOA) techniques.

In the code or range dimension, the GPS receiver accomplishes the correlation process by first searching for the phase of the particular SV that it is attempting to track and then tracking the SV code state by adjusting the nominal chipping rate of the receiver's replica code generator so as to compensate for Doppler-induced effects of the SV PRN code due to the relative dynamics between the receiver and the SV. That is, as the SV is approaching the receiver, the apparent frequency of the received code increases whereas if the SV is moving away from the satellite receiver, the apparent frequency of its PRN code decreases.

Thus, the satellite receiver must replicate the carrier signal of the SV so that it matches the frequency of this SV carrier. If the carrier signal is successfully acquired by successfully replicating the SV code and carrier frequency during an initial search process, the satellite receiver can determine the time of arrival of the SV code and thereby determine the range of the SV through use of the above mentioned navigation data which determines the position of the satellite at the time of the code transmission.

Initially, correlators used in satellite receivers were relatively expensive and consequently only one correlator bank of three correlators typically was used. This resulted in the need to do sequential satellite measurements which introduced many sources for navigation inaccuracies.

Modern low-cost portable consumer GPS receivers have twelve correlator banks and can thus track all visible SVs at the same time.

FIG. 1 shows a correlator bank 11 and other components of the code tracking loop 8 of a GPS receiver, which uses the techniques of the present invention to minimize the effects of multipath components in the received signal. The correlator bank comprises correlators 12 which typically cover a delay range of 2 chips and thus the correlation triangle shown in FIG. 2 is entirely covered. FIG. 1 also shows the carrier tracking loop 9 of a GPS satellite receiver.

The GPS carrier tracking loop 9 incorporates a carrier phase detector 14, a carrier loop filter 16 and a numerically controlled oscillator (NCO) 18. The carrier phase detector receives an input signal from one of the correlators 12, typically the correlator 12' associated with the point of maximum correlation (called the Prompt (P) correlator).

The purpose of the carrier tracking loop is to make adjustments at the receiver for variations in the carrier frequency due to Doppler effects; that is, the effects associated with the SV moving toward or away from the receiver.

The code tracking loop 8 is responsible for tracking the incoming PRN code generated by a particular SV. Each SV generates a unique PRN code. For civilian use, each PRN code comprises 1,023 bits (chips) generated every 1 millisecond. The particular PRN code for a particular SV is unique to that SV and the particular PRN codes for the other SVs forming the GPS satellite constellation are chosen to have minimum cross-correlation to one another, thereby facilitating detection of each SV with minimum interference from the PRN codes received from the other SVs. In order to do this detection, a correlation is made between the received PRN code from the SV and a replica code generated by a replica code generator 22. The replica code generator signal is delayed for a period of time by a delay module 24, with there being multiple delay modules 24 for generating multiple delayed output signals 25 such that the output signals represent a shifting of the replica code in phase. For the system shown in FIG. 1 the sample rate is twice the chip frequency $f_c$ 43 and thus each delay mode is ½ chip. In this way the correlators can effectively correlate each of the delayed signals with the incoming PRN code to determine which correlator has the maximum correlation value as generated by the correlator outputs 26. It should be noted that these correlator outputs represent the magnitude of the correlation based upon the real (I) and complex (Q) values of same.

Figure 1A:
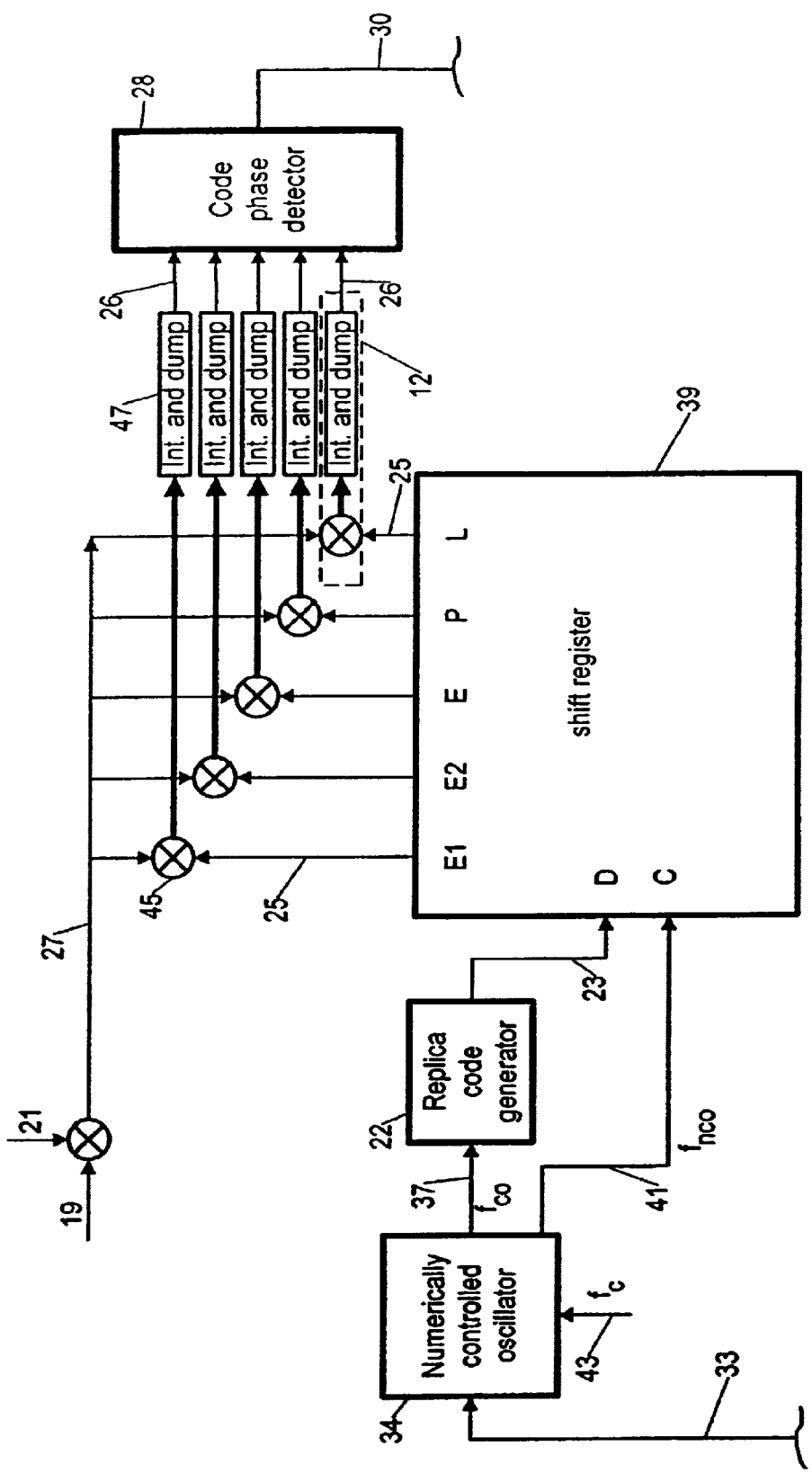
FIG. 1A is a block diagram showing the use of a shift register to perform the function of the delay module shown in FIG. 1.

These output signals are presented to a code phase detector 28 which measures these correlation output signals and based upon the values of the associated signals, generates a code phase detector output signal 30 for causing an adjustment to the generation of the replica code on output 23 so that the maximum correlation value occurs for the prompt (P) correlator 12'. This adjustment is performed in association with a code loop filter 32 having an output 35 connected to a numerically controlled oscillator 34 for adjusting the phase of the replica PRN code by adjusting the frequency of its output signal 37 (fco). As seen in FIGS. 1 and 1A, the delay modules 24 can be implemented by use of a shift register 39. The signal $f_{nco}$ 41 generated by the NCO 34 is used to clock the shift register. For a sampling rate equal to twice the chip rate, samples of the replica code are stored every ½ chip.

As also seen in FIG. 1A, each correlator 12 typically comprises a multiplier 45 and an integrator and dump module 47.

Figure 3:
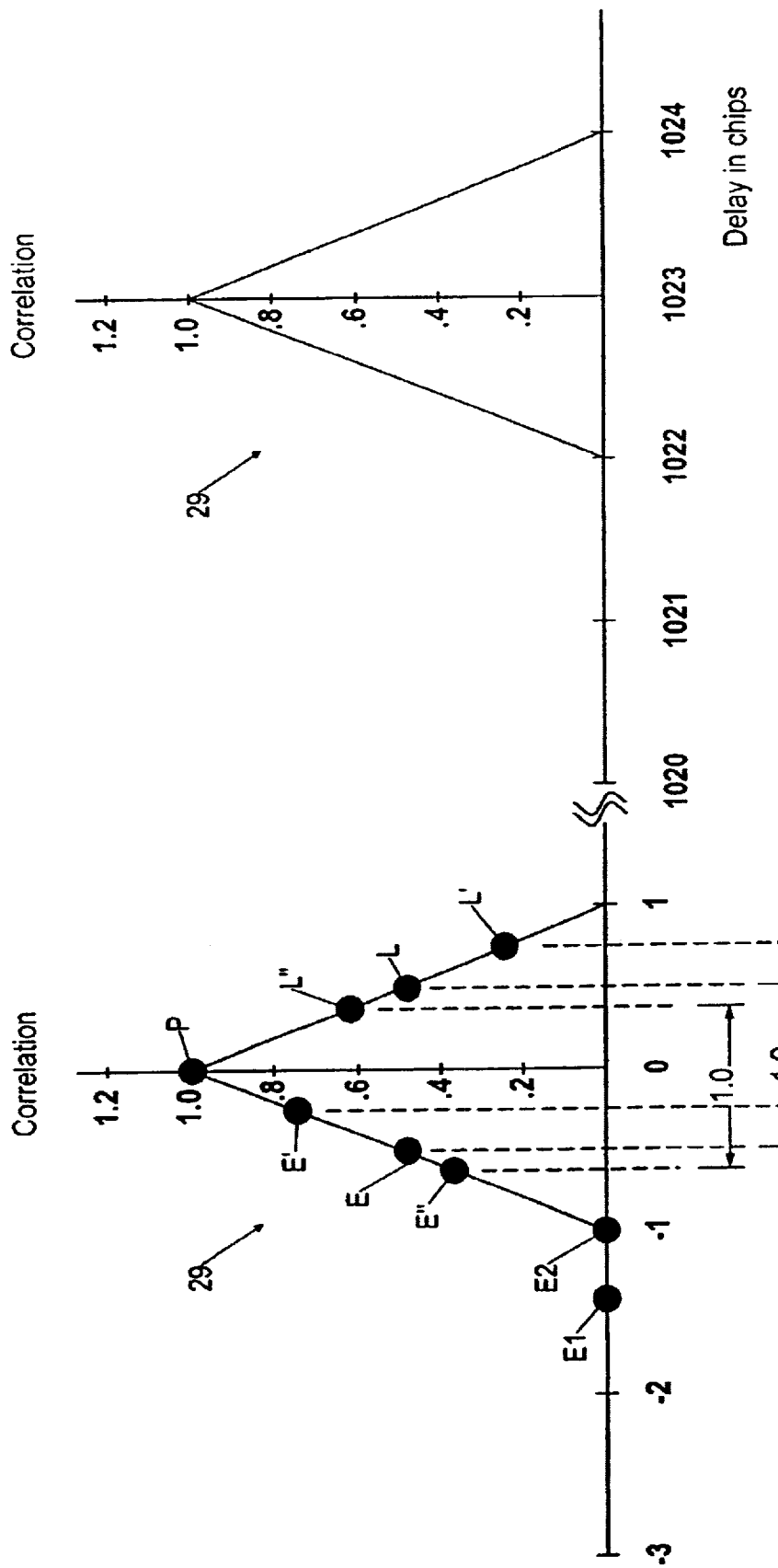
FIG. 3 shows an ideal correlation function similar to FIG. 2A, also showing two variables, E1 and E2, that are used to minimize the effects of multipath components.

FIG. 3 is an illustration of the triangular shaped correlation output for an ideally received PRN code when a match is made between the received code and the generated replica code. As seen in FIGS. 1 and 3, the incoming satellite receiver signal 15 is first downconverted by downconverter 13 and then digitized by digitizer 17 so as to generate a digitized output 19. This digitized signal is then multiplied (mixed) by multiplier 20 with carrier phase adjusted signal 21 from the carrier loop. The output of the multiplier is the received PRN code 27 which is simultaneously presented to each correlator 12 in correlator bank 11.

As seen in FIG. 3, for an ideal signal without multipath components, the correlation triangle 29 would occur for each repetitively received PRN code.

FIG. 1 illustrates how this correlation is determined. Although more than three correlators can be used, the correlation principle is based on three correlators. The last correlator is called the late (L) correlator, the next to the last correlator is the prompt (P) correlator 12', and the third from the last correlator is the early (E) correlator. The code phase detector makes a measurement of the E–L correlation value (see E–L code phase detector 31). If E–L is not equal to zero, the NCO 34 is adjusted until the phase of the replica code is adjusted to the point where E–L=0. Typically the early (E) correlator is phase shifted ½ chip from the prompt (P) correlator, as is the late (L) correlator but in the opposite direction. As can be seen in FIG. 3, if the replica code is slightly out of phase with respect to the received PRN code (see E' and L', or E" and L"), then the E–L code phase detector has information about the magnitude and direction of the required NCO adjustment in order to correct for this phase error.

It should be noted in FIG. 3, that an ideal correlation without multipath is non-zero starting at −1 chip and ending at +1 chip. Therefore a correlator delay of −1 chip (such as the E2 correlator value) should be zero when E–L=0. Similarly, a correlator delay of more than −1 chip (such as −1.5 chip for correlator E1) will also have a zero correlation value. Thus the delay value for each delay module 24 is 0.5 chip for the three correlators associated with E, P and L as well as for E2 and E1. A shift register 39 can be used to perform the functions of all the delay modules 24 as shown in FIG. 1A. If a more rapid sampling rate is desired, the number of correlators is proportional to the sampling rate increase. For example if one-tenth chip spacing is desired, then a twenty bit shift register is used for the delays in association with twenty correlators. The E1 and E2 values would require at least two more bits to the shift register and two more correlators. The number of bits for the shift register may be greater than two if the delay spacing is to be approximately 0.5 chip for E1 compared to E2.

Multipath Considerations

Figure 2B:
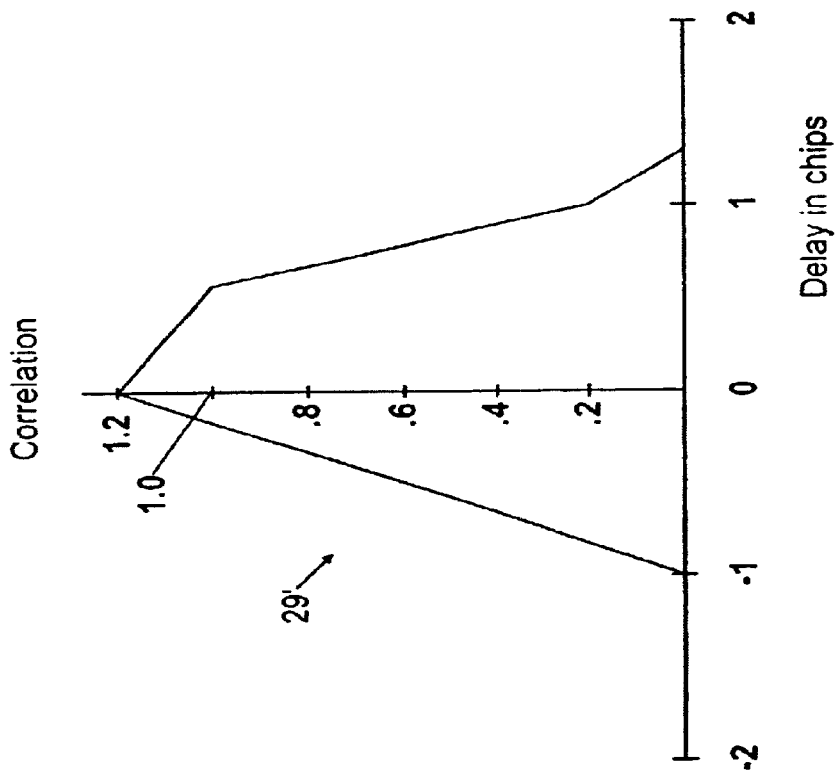
FIG. 2B is a diagram of the correlation function of a received PRN code to a replica PRN code, where the received signal containing the PRN code has −6 dB multipath components at 0.5 chip delay.
Figure 2A:
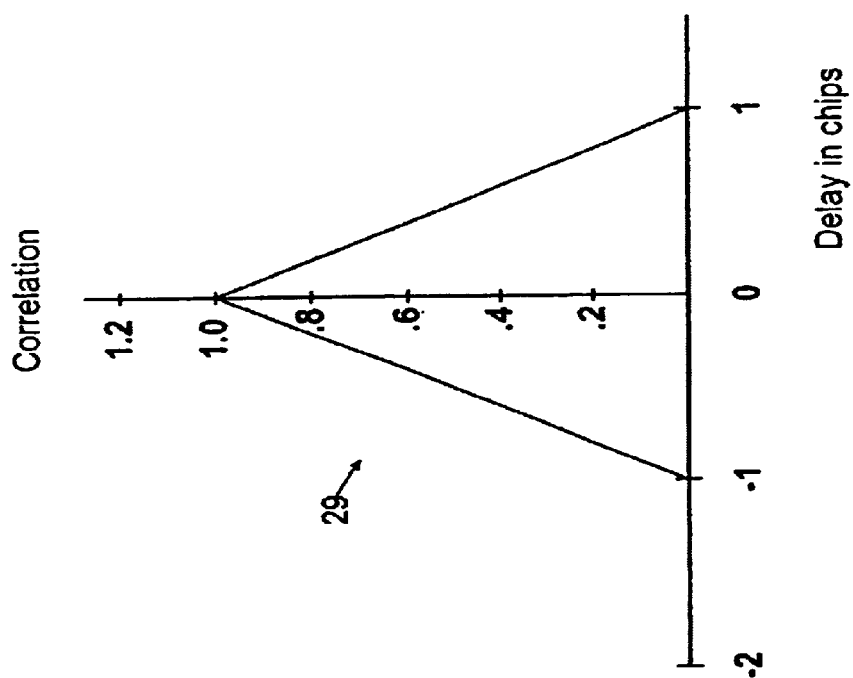
FIG. 2A is a diagram showing ideal correlation of a repetitive PRN code with a replica PRN code.
Figure 4:
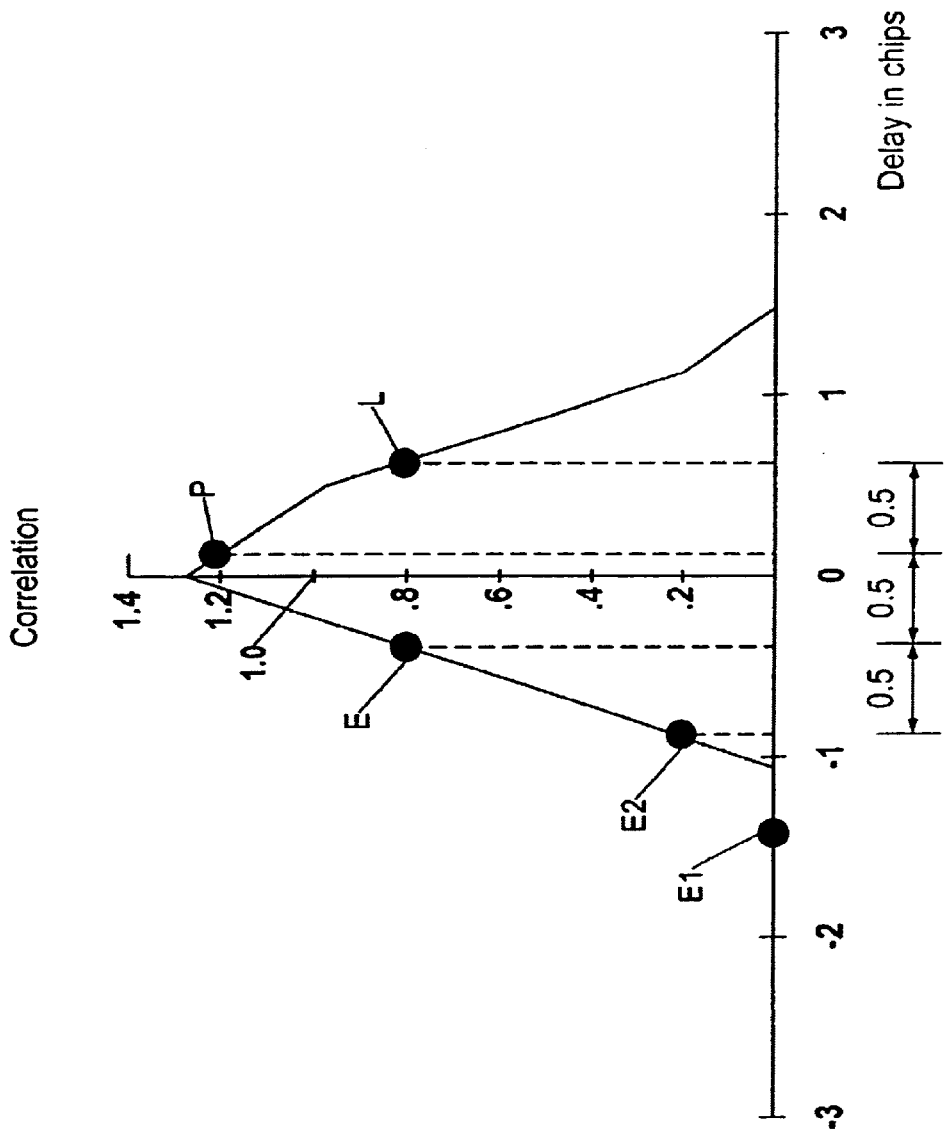
FIG. 4 is a diagram similar to FIG. 3 showing the position of variables E1 and E2 as well as the movement of the prompt correlator P due to multipath components in the received signal.

The triangular correlation function 29 shown in FIGS. 2 and 3 will be distorted when there is one or more multipath components of the received signal. Thus FIG. 2B shows the theoretical distortion of a complex correlator output with a −6 dB or 0.5 chip delayed multipath signal. In an actual bandlimited case the "sharp corner" at 0 delay is much more rounded. It is seen in FIGS. 2B and 4 that the presence of one or more multipath components can shift the determined prompt (P) correlator phase. How this result occurs can be seen by reference to FIG. 4. As seen in FIG. 4, the multipath component(s) can change the shape of the correlation triangle to a multi-segment shape 29'. It is then possible for the E–L detector to have a zero output which incorrectly places the prompt (P) correlator to the right of time of maximum correlation (0 chip delay).

But as also seen in FIG. 4, in such a situation, the E2 correlator value has "climbed up" the correlation "triangle" and thus E2−E1>0. This value of E2−E1 can then be used to further adjust the NCO 34 so as to move the phase of the replica code to the left (for the example shown in FIG. 4, this shift to the left would be −0.2 chip).

Figure 5:
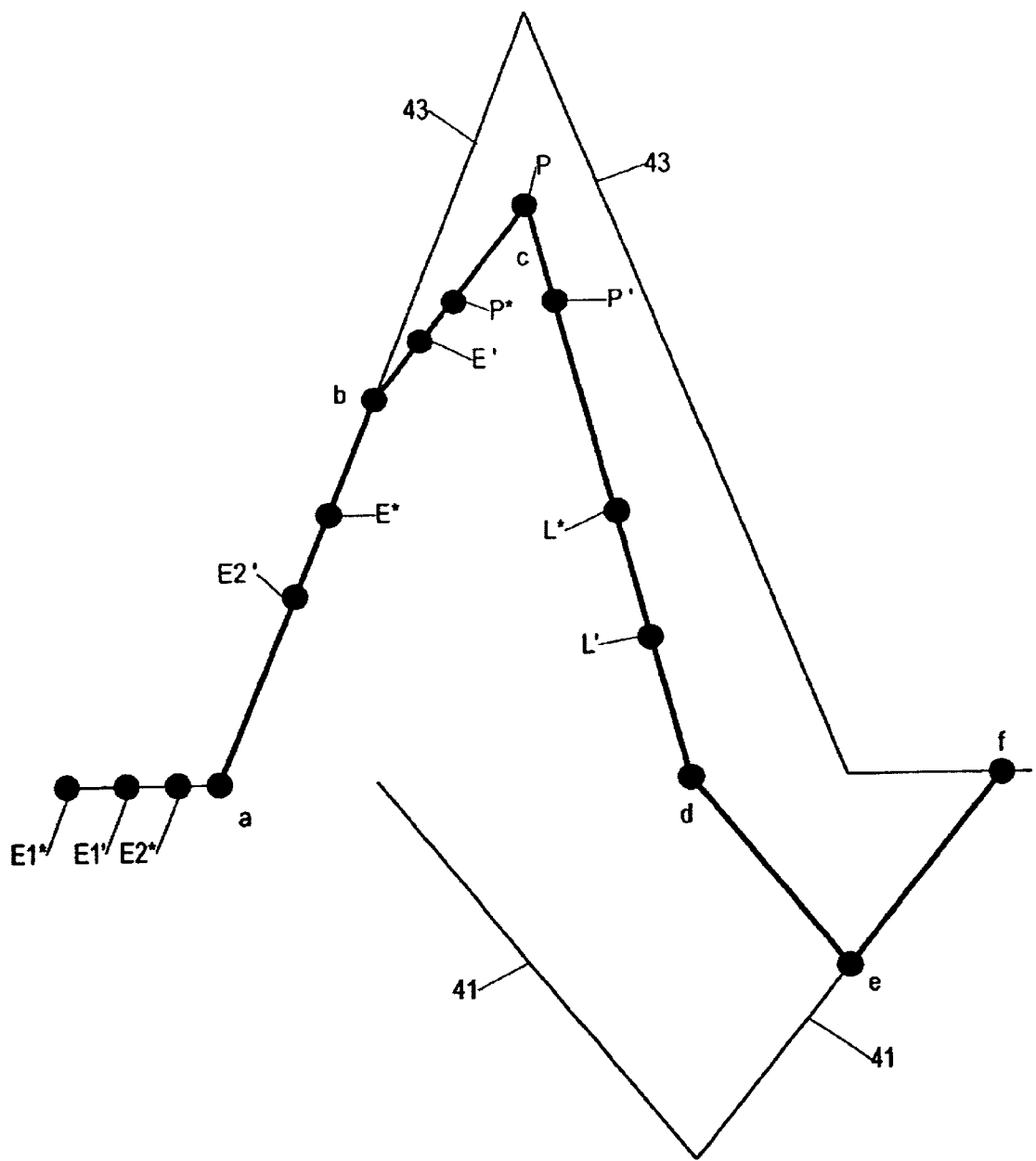
FIG. 5 is a diagram similar to FIG. 4 showing how a 180 degree out of phase multipath component can skew the correlation triangle to the left.

As seen in FIG. 5, it is possible that multipath can shift the timing to the left in which case E2−E1 would remain at zero. Such a shift to the left is the result of a multipath component(s) being for example 180 degrees out of phase with the direct path signal. Such a multipath component is seen by component 41. When this component is added to the direct path component correlation triangle 43, the resultant correlation function is defined by points a, b, c, d, e and f. It is therefore seen that for a ½ chip sampling rate, the $E^*-L^*$ detector is skewed to left which causes the prompt delay point to be skewed to the left at location $P^*$, rather than the true point of maximum correlation at point P. In this case E2−E1 would equal zero since these delay points are also skewed to the left (see $E2^*$ and $E1^*$).

To avoid this situation the E–L discriminator 31 in the code phase detector 28 is modified to force the timing values to the right by adding a constant C1 to the E–L detector output. Thus the timing estimate is calculated until E–L−C1=0. The value of C1 should be as large as the maximum shift to the left that is likely to be as encountered. Typical values for constant C1 are in the range from 0.15 to 0.3.

For example with C1=0.25 the E–L−0.25=0 location would result in P being shifted to point P' to the right of the true point of maximum correlation (P) (see E' and L' with P' at the midpoint). However it is then seen that E2' has "moved up" the correlation curve. Thus since E2'−E1'>0, the E2−E1 detector causes an adjustment to the left until E2−E1=0, which moves the prompt correlator to the true point of maximum correlation at point (P).

In addition, it should be noted that the PRN Gold codes are not ideal (the codes do have some cross-correlation) and the limited bandwidth of the signals smoothes the correlation function as seen in FIGS. 2A, 2B, 3 and 4. Low level received signals also affect the correlation function. As a result, E2−E1 is compared to a constant C2 that is determined based upon system characteristics. The smoothing of triangular correlation function causes the actual value of E2 to not be at a zero level when the prompt delay is at the point of maximum correlation, but rather E2 is slightly positive. This smoothing of the triangular correlation function depends on the RF performance of the GPS receiver as well as the channel characteristics of the signal transmission. In addition, some of the PRN "Gold" codes do not have an autocorrelation function that is exactly triangular in shape but may have some artifacts. Thus the value of C2 can be adjusted depending on which SV is being received. A typical value of C2 is in the range from 0 to 0.1.

With this modification, the code phase detector sequence is as follows:

Calculate timing estimates based upon E−L=C1.

If E2−E1>C2, use E2−E1−C2 as the timing estimate.

Figure 6:
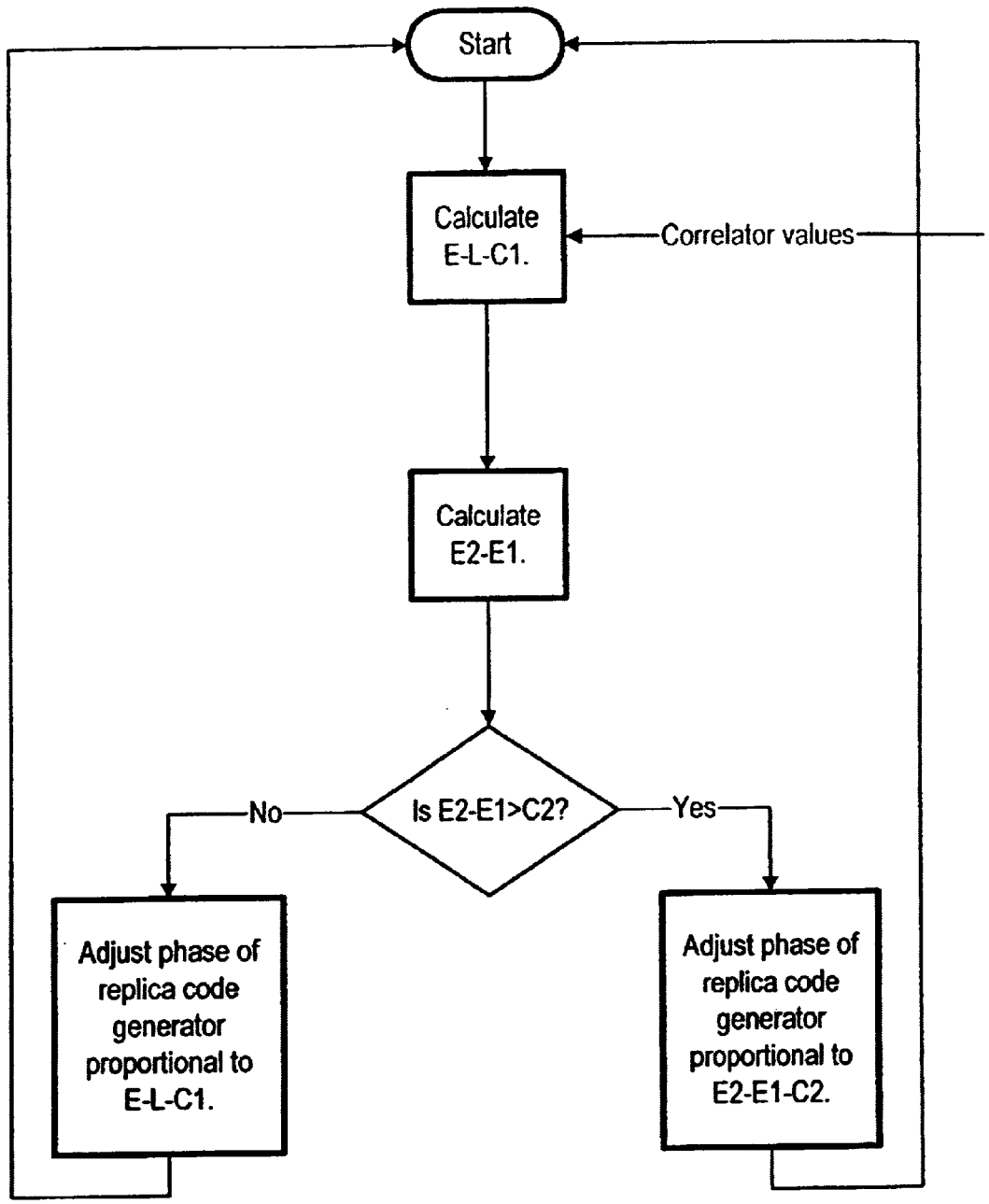
FIG. 6 is a flow chart of the correlation methodology according to the present invention.

FIG. 6 is a flow chart illustrating this methodology.

In this manner, the effects from multipath components are minimized and these effects can be minimized even with limited bandwidth codes and in the presence of low signal levels. Thus this methodology for minimizing the effects from multipath components considerably improves the delay estimation accuracy for the GPS receiver. By better determining the delay estimate of the replica code, a better timing match to the incoming PRN code is achieved. Since the incoming GPS PRN code is used to determine TOA (based upon the fact that it is generated from a stable system clock at the SV), a better delay estimate yields a better TOA which therefore yields a better positioning range for that SV and ultimately a better positioning accuracy as determined by the use of multi SVs in traditional GPS positioning methodology.

Although the preferred embodiment of the invention uses the traditional E-L detector as the main detector for purposes of making timing estimation with the further use of the E2-E1 values, any other kind of detector beside the E-L detector can be used.

The overall methodology for compensating for multipath components is an easy to implement methodology which yields good multipath rejection. The circuitry necessary to implement this methodology is straight-forward and makes use of additional variables (E1, E2) which are used by the code phase detector to further determine if there are multipath components present and if so, how to better determine the timing estimation for the replica code generator.

It is readily apparent to those skilled in the art that the objects set forth above have been efficiently attained, and since certain changes may be made in carrying out the above method and in construction set forth without departing from the scope of the invention, it is intended that all matter contained in the above description or shown in the accompanying drawings shall be interpreted as illustrative and not in a limiting sense.

It should also be understood that the following claims are intended to cover all of the generic and specific features of the invention herein described, and all statements of the scope of the invention which, as a matter of language, might be said to fall therebetween.

Having described the invention, what is claimed is:

1. A method of reducing the effects of multipath signal components associated with a received direct path signal comprising a carrier frequency that is modulated by a repetitive pseudo-random noise (PRN) code having M chips of code length, where M is a positive integer, comprising the steps of:

demodulating the receive signal to obtain the PRN code;

generating a replica code corresponding to the pseudo-random noise (PRN) code of the received signal;

delaying the generated replica code for at least first, second and third different delay times equal in delay distance from each other, where each delay distance is less than one chip;

further delaying the replica code for a fourth delay time equal to 1 chip from the second delay time and further delaying the replica code for a fifth delay time equal to more than one chip from the second delay time;

correlating each delayed replica code with the demodulated PRN code so as to generate a correlation value for each delayed replica code;

adjusting the start time of the replica code generator until the first and third delay time correlation values are substantially equal to each other and are greater than a predetermined value;

determining if the correlation values for the fourth and fifth delay times are substantially equal to each other and if the fourth and fifth correlation values are not substantially equal to each other, adjusting the replica code generator so as to cause the fourth and fifth correlation values to be substantially equal to each other; and;

considering the second delay time to be the start of the PRN code.

2. A method of reducing the effects of multipath signal components as defined in claim 1, wherein the first delay time correlation value is called the late (L) correlation value, where the second delay time correlation value is called the prompt (P) correlation value, where the third delay time correlation value is called the early (E) correlation value, where the fourth delay time correlation value is called the E2 correlation value, and where the fifth delay time correlation value is called the E1 correlation value, and wherein the step of adjusting the start time of the replica code generator includes the step of adjusting the start time of the replica code generator until E-L-C1 is equal to a predetermined value, where C1 is a constant, and further wherein the step of determining if the correlation values of the fourth and fifth delay times are substantially equal is performed by determining if E2-E1>C2, where C2 is a constant, and if E2-E1>C2, then further adjusting the start time of the replica code generator until E2-E1-C2 is equal to a predetermined value.

3. A method of reducing the effects of multipath signal components as defined in claim 2, wherein the value of constant C1 is in the range from 0.15 to 0.3

4. A method of reducing the effects of multipath signal components as defined in claim 3, wherein the value of constant C2 is in the range from 0 to 0.1.

5. A method of reducing the effects of multipath signal components as defined in claim 4, wherein the E1 delay time is a delay of approximately −1.5 chips from the second delay time.

6. A system for reducing the effects of multipath signal components associated with a received direct path signal comprising a carrier signal that is modulated by a repetitive pseudo-random noise (PRN) code having M chips of code length, where M is a positive integer, comprising:

A) means for extracting the PRN code from the received signal;

B) a replica code generator for repetitively generating a replica code corresponding to the pseudo-random noise (PRN) code of the received signal;

C) a numerically controlled oscillator (NCO) for adjusting the start time and frequency of the replica code generator to generate the replica PRN code;

D) a plurality of delay modules in sequence with the replica code generator for delaying the generated replica code for at least first, second and third different delay times equal in delay distance from each other, where each delay distance is less than one chip and for delaying the replica code for a fourth delay time equal to 1 chip from the second delay time and further delaying the replica code for a fifth delay time equal to more than one chip from the second delay time;

E) a plurality of correlators each for receiving a replica code from the output of a different delay module and for receiving the PRN code from the received signal, each correlator generating a correlation value;

F) a code phase detector receiving the outputs of the plurality of correlators for generating an adjustment signal;

G) means, receiving the adjustment signal from the code phase detector, for filtering the adjustment signal and presenting the filtered adjustment signal to the NCO;

wherein the adjustment signal generated by the code phase detector causes an adjustment in the start time of the replica code generator until the first and third delay time correlation values are substantially equal to each other and are greater than a predetermined value and further wherein the code phase detector has means for determining if the correlation values for the fourth and fifth delay times are substantially equal to each other and if the fourth and fifth correlation values are not substantially equal to each other, causing the adjustment signal to adjust the replica code generator so as to cause the fourth and fifth correlation values to be substantially equal to each other, whereby the second delay time after said adjustments is considered to be the start of the received PRN code.

7. A system for reducing the effects of multipath signal components as defined in claim 6, wherein the first delay time correlation value is called the late (L) correlation value, where the second delay time correlation value is called the prompt (P) correlation value, where the third delay time correlation value is called the early (E) correlation value, where the fourth delay time correlation value is called the E2 correlation value, and where the fifth delay time correlation value is called the E1 correlation value, and wherein the adjustment signal generated by the code phase detector includes means for generating an adjustment signal for adjusting the start time of the replica code generator until E–L–C1 is equal to a predetermined value, where C1 is a constant, and further wherein the code phase detector determines if the correlation values of the fourth and fifth delay times are substantially equal to each other and for causing the generation of an adjustment signal to cause the fourth and fifth correlation values to be substantially equal to each other is performed by said code phase detector having means for determining if E2–E1>C2, where C2 is a constant, and if E2–E1>C2, then further generating an adjustment signal to adjust the replica code generator until E2–E1–C2 is equal to a predetermined value.

8. A system for reducing the effects of multipath signal components as defined in claim 7, wherein the value of constant C1 is in the range from 0.15 to 0.3.

9. A system for reducing the effects of multipath signal components as defined in claim 8, wherein the value of constant C2 is in the range from 0 to 0.1.

10. A system of reducing the effects of multipath signal components as defined in claim 9, wherein the E1 delay time is a delay of approximately –1.5 chips from the second delay time.

11. A device for reducing the effects of multipath signal components associated with a received direct path signal forming an overall received signal, wherein each component and direct path signal is modulated by a repetitive pseudo-random noise (PRN) code having M chips of code length, where M is a positive integer, comprising:

A) a replica code generator for repetitively generating a replica code corresponding to the pseudo-random noise (PRN) code of the received signal;

B) a numerically controlled oscillator (NCO) for adjusting the start time and frequency of the replica code generator to generate the replica PRN code;

C) means for delaying the replica code a plurality of times having the same delay length between adjacent delayed replica codes;

D) means for correlating each delayed replica code with the overall received signal;

E) a code phase detector receiving the outputs of the correlating means for generating an adjustment signal and presenting said adjustment signal to the NCO so as to adjust the start time for the replica code generator;

wherein the adjustment signal generated by the code phase detector causes an adjustment in the start time of the replica code generator until the difference between two time correlation values are substantially equal to a first predetermined value provided that the difference between the correlation values for two other delay times are less than a second predetermined value, and if the difference between said two other correlation values is greater than said second predetermined value, causing an adjustment in the start time of the replica code generator until said difference between the correlation values of said two other delay times is less than said second predetermined value.

12. A device for reducing the effects of multipath signal components associated with a received direct path signal forming an overall received signal as defined in claim 11, wherein the means for delaying the replica code a plurality of times delays the replica code at least five times, wherein the first delay time correlation value is called the late (L) correlation value, where the second delay time correlation value is called the prompt (P) correlation value, where the third delay time correlation value is called the early (E) correlation value, where the fourth delay time correlation value is called the E2 correlation value, and where the fifth delay time correlation value is called the E1 correlation value, and wherein the adjustment signal generated by the code phase detector includes means for generating an adjustment signal for adjusting the start time of the replica code generator until E–L–C1 is equal to a predetermined value, where C1 is a constant, and further wherein the code phase detector determines if the correlation values of the fourth and fifth delay times are substantially equal to each other and for causing the generation of an adjustment signal to cause the fourth and fifth correlation values to be substantially equal to each other is performed by said code phase detector having means for determining if E2–E1>C2, where C2 is a constant, and if E2–E1>C2, then further generating an adjustment signal to adjust the replica code generator until E2–E1–C2 is equal to a predetermined value.

13. A device for reducing the effects of multipath signal components as defined in claim 12, wherein the value of constant C1 is in the range from 0.15 to 0.3.

14. A device for reducing the effects of multipath signal components as defined in claim 13, wherein the value of constant C2 is in the range from 0 to 0.1.

15. A device for reducing the effects of multipath signal components as defined in claim 12, wherein the value of constant C2 is in the range from 0 to 0.1.

16. A device for reducing the effects of multipath signal components associated with a received direct path signal forming an overall received signal as defined in claim 12, wherein the means for delaying the replica code a plurality of times delays the replica code N times, and wherein the delay length between adjacent delayed replica codes is equal to $$\frac{1}{2 \cdot fc},$$

where fc is the chip frequency of the PRN code.

17. A device for reducing the effects of multipath signal components associated with a received direct path signal forming an overall received signal as defined in claim 11, wherein the means for delaying the replica code a plurality of times delays the replica code N times, and wherein the delay length between adjacent delayed replica codes is equal to $$\frac{1}{2 \cdot fc},$$

where fc is the chip frequency of the PRN code.

18. A method for reducing the effects of multipath signal components associated with a received direct path signal forming an overall received signal, wherein each component and direct path signal is modulated by a repetitive pseudo-random noise (PRN) code having M chips of code length, where M is a positive integer, comprising the steps of:

repetitively generating a replica code corresponding to the pseudo-random noise (PRN) code of the received signal;

adjusting the start time and frequency of the replica code to generate the replica PRN code;

delaying the replica code a plurality of times having the same delay length between adjacent delayed replica codes;

correlating each delayed replica code with the overall received signal;

receiving the outputs of the correlating step so as to generate an adjustment signal that adjusts the start time of the replica code;

wherein the adjustment signal causes an adjustment in the start time of the replica code until the difference between two time correlation values are substantially equal to a first predetermined value provided that the difference between the correlation values for two other delay times are less than a second predetermined value, and if the difference between said two other correlation values is greater than said second predetermined value, causing an adjustment in the start time of the replica code until said difference between the correlation values of said two other delay times is less than said second predetermined value.

19. A method for reducing the effects of multipath signal components associated with a received direct path signal forming an overall received signal as defined in claim 18, wherein the delaying of the replica code a plurality of times delays the replica code at least five times, wherein the first delay time correlation value is called the late (L) correlation value, where the second delay time correlation value is called the prompt (P) correlation value, where the third delay time correlation value is called the early (E) correlation value, where the fourth delay time correlation value is called the E2 correlation value, and where the fifth delay time correlation value is called the E1 correlation value, and wherein the adjustment signal further adjusts the start time of the replica code until E-L-C1 is equal to a predetermined value, where C1 is a constant, and further determining if E2-E1>C2, where C2 is a constant, and if E2-E1>C2, then further generating an adjustment signal to adjust the replica code until E2-E1-C2 is equal to a predetermined value.

20. A method for reducing the effects of multipath signal components as defined in claim 19, wherein the value of constant C1 is in the range from 0.15 to 0.3.

21. A method for reducing the effects of multipath signal components as defined in claim 20, wherein the value of constant C2 is in the range from 0 to 0.1.

22. A method for reducing the effects of multipath signal components as defined in claim 19, wherein the value of constant C2 is in the range from 0 to 0.1.

23. A method for reducing the effects of multipath signal components associated with a received direct path signal forming an overall received signal as defined in claim 19, wherein the step of delaying the replica code a plurality of times delays the replica code N times, and wherein the delay length between adjacent delayed replica codes is equal to $$\frac{1}{2 \cdot fc},$$

where fc is the chip frequency of the PRN code.

24. A method for reducing the effects of multipath signal components associated with a received direct path signal forming an overall received signal as defined in claim 18, wherein the step of delaying the replica code a plurality of times delays the replica code N times, and wherein the delay length between adjacent delayed replica codes is equal to $$\frac{1}{2 \cdot fc},$$

where fc is the chip frequency of the PRN code.

* * * * *